No. 884,050. PATENTED APR. 7, 1908.
A. L. STREETER.
JOURNAL BEARING.
APPLICATION FILED APR. 14, 1902.
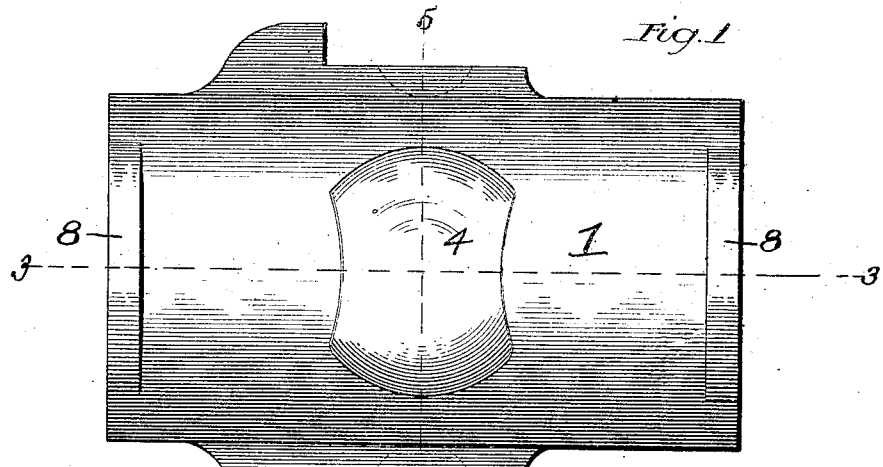
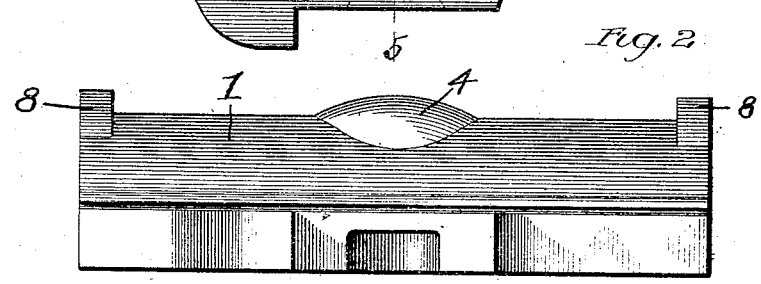
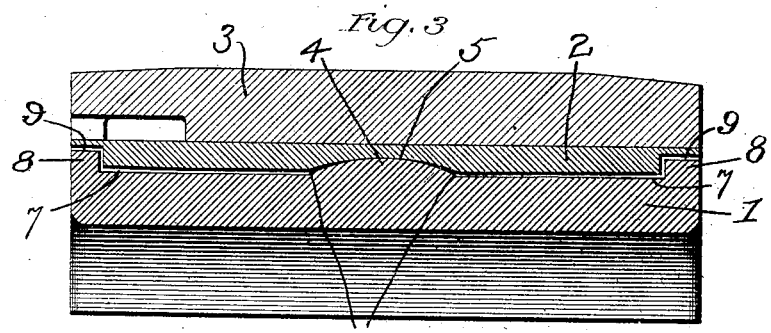
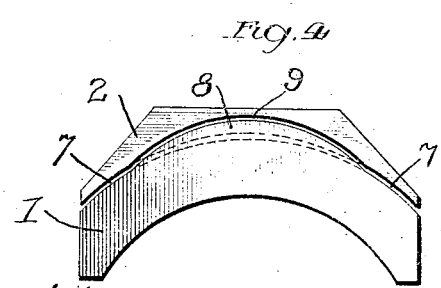
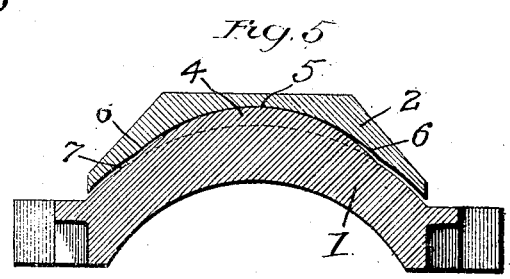

UNITED STATES PATENT OFFICE.

ALFRED L. STREETER, OF CHICAGO, ILLINOIS.

JOURNAL-BEARING.

No. 884,050.	Specification of Letters Patent.	Patented April 7, 1908.

Application filed April 14, 1902. Serial No. 102,835.

To all whom it may concern:

Be it known that I, ALFRED L. STREETER, a citizen of the United States, and a resident of Chicago, in the county of Cook and State of Illinois, have invented a Journal-Bearing, of which the following is a specification.

This invention relates to journal brasses and relates particularly to journal bearing for freight cars and the like.

Among the objects of the invention are to reduce the amount of scrap in journal bearings when said bearings are worn out; and to provide for limited play of the axle relatively to the truck frame, thereby materially reducing the wear on the flanges of the wheels in rounding curves and the like.

To this end my invention consists of the various features, combinations of features and details of construction hereinafter described and claimed.

In the accompanying drawings, a journal bearing of my invention is fully illustrated.

Figure 1 is a top plan view of a journal bearing of my invention. Fig. 2 is a side view thereof. Fig. 3 is a longitudinal sectional view thereof on the line 3—3 of Fig. 1. Fig. 4 is an end view thereof; and Fig. 5 is a transverse sectional view thereof on the line 5—5 of Fig. 1.

A journal bearing of my invention consists of two separate parts, the bearing proper 1, which forms a saddle resting on the axle, and a cap 2 inserted between said bearing proper 1 and the wedge 3. The section 1 is commonly made of brass. The part 2 may be made of brass, steel or other strong metal.

Formed at the center of the back of the bearing proper 1 is a spherical boss 4, which is adapted to engage a corresponding spherical recess 5 in the cap 2. The recess 5 is preferably of larger radius than the boss 4, thus forming a clearance space between said boss and the sides of said recess, as shown at 6. Preferably, also, clearance spaces 7 are provided between the bearing proper 1 and the cap 2, said spaces becoming larger remote from the boss 4. With this construction it is obvious that said bearing proper and cap may turn slightly upon the boss 4 as a pivot without lifting, thus making provision for the desired play of the axle relatively to the truck frame in rounding curves.

While I have herein shown the boss 4 on the bearing proper and the recess 5 formed in the cap, it is obvious that this arrangement may be reversed without in any way departing from my invention.

In order to prevent endwise displacement of the cap 2 and bearing proper 1 relatively to each other, they are preferably provided with opposed shoulders, which will limit the movement of said cap relatively to said bearing proper, when in use. As shown, flanges 8 are formed at the ends of the bearing proper 1 which engage corresponding recesses 9 in the cap 2.

The dimensions of the bearing proper 1 and of the cap 2 are such that together they will conform to the M. C. B. standards, thus providing for replacing them with M. C. B. standard bearings in case bearings of my invention are not available. The caps 2 may be used almost indefinitely, thus when it is desired to renew a bearing it is only necessary to replace the bearing proper 1 which will effect a saving in the amount of scrap each time the bearing proper is renewed equal to the weight of the cap 2.

While, for convenience of illustration, I have, in the drawings, shown my improved pivot bearing as applied between the bearing brass proper 1 and the cap 2, it is obvious that, as regards this feature of my invention, it is immaterial where the same is applied and that the same results would be attained by applying said pivot bearing between other members of the journal bearing, as between a bearing brass of usual form and the wedge. Furthermore, while I have herein shown the boss 4 and recess 5 as forming segments of spheres, that is, as forming curves of uniform radius, I do not desire to limit myself to this construction, as the same action would result with other forms of rounded boss and recess.

I claim:—

1. A bearing brass for car journals consisting of two separate sections, a lower bearing section to receive the journal and an upper section to contact with the wedge, which said upper section overlies said lower section, said sections being provided one with a rounded boss and the other with a corresponding recess of less depth than the height of the boss, thereby providing clearance between the overlying surfaces of said sections outside of said boss and recess, the relation being such that relative movement of said sections will be limited by contact of the overlying surfaces thereof outside of said boss and recess, and said sections being also provided at their ends, one with flanges and the other with shoulders opposed thereto, the two sections constituting a unit conforming exteriorly to the Master Car Builders' standard bearing brass, substantially as described.

2. A journal bearing comprising members one of which overlies and is supported upon the other, there being a pivot bearing between said members and clearance spaces between the overlying projecting portions thereof outside of the pivot bearing, the relation being such that relative movement of said sections will be limited by contact of the overlying projecting portions thereof outside of said pivot bearing, substantially as described.

3. A journal bearing comprising members one of which overlies and is supported upon the other, there being a pivot bearing between said members and clearance spaces between the overlying projecting portions thereof in all directions outside of the pivot bearing, the relation being such that relative movement of said sections will be limited by contact of the overlying projecting portions thereof outside of said pivot bearing, substantially as described.

4. A journal bearing comprising members one of which overlies and is supported upon the other, said members being provided one with a rounded boss and the other with a corresponding recess of less depth than the height of the boss, thereby providing clearance between the overlying projecting portions of said members in all directions outside of said boss and recess, the relation being such that relative movement of said members will be limited by contact of the overlying projecting portions of said members outside of said boss and recess, substantially as described.

5. A journal bearing comprising members, one of which overlies and is supported upon the other, said members being provided one with a rounded boss and the other with a corresponding recess of less depth than the height of said boss, thereby providing clearance spaces between the surfaces of said members outside of said boss and recess, said boss being loosely fitted to said recess and the relation being such that relative movement of said members will be limited by contact of opposed surfaces of said members outside of said boss and recess.

6. A journal bearing comprising members one of which overlies and is supported upon the other, said members being provided one with a rounded boss and the other with a corresponding recess of less depth than the height of said boss and of greater radius, thereby providing clearance between the overlying surfaces of said members outside of said boss and recess, the relation being such that relative movement of said members will be limited by contact of the overlying surfaces of said members outside of said boss and recess, substantially as described.

7. A journal bearing comprising members one of which overlies and is supported upon the other, said members being provided one with a rounded boss and the other with a corresponding recess of less depth than the height of the boss providing clearance between the overlying surfaces of said members in all directions outside of said boss and recess, the relation being such that relative movement of said members will be limited by contact of the overlying surfaces of said members outside of said boss and recess, and said members being also provided at their ends one with flanges and the other with shoulders opposed thereto, substantially as described.

In testimony, that I claim the foregoing as my invention, I affix my signature in presence of two subscribing witnesses, this 11th day of April, A. D. 1902.

ALFRED L. STREETER.

Witnesses:
M. S. SOMERVILLE,
JOHN A. McKEOWN.